(12) United States Patent
Alonso Vazquez et al.

(10) Patent No.: US 11,260,782 B1
(45) Date of Patent: Mar. 1, 2022

(54) BRACKET ASSEMBLY FOR A VEHICLE

(71) Applicant: Ford Global Technologies, LLC, Dearborn, MI (US)

(72) Inventors: Liliana Alonso Vazquez, Mexico City (MX); Alfredo Ivan Trujillo Rolon, Benito Juarez (MX); Raul Ezequiel Alvarez Ruiz, Estado de Mexico (MX); Andrew John Abramouski, Royal Oak, MI (US); Carlos Ernesto Saenz Camacho, Calimaya (MX)

(73) Assignee: Ford Global Technologies, LLC, Dearborn, MI (US)

( * ) Notice: Subject to any disclaimer, the term of this patent is extended or adjusted under 35 U.S.C. 154(b) by 3 days.

(21) Appl. No.: 17/002,853

(22) Filed: Aug. 26, 2020

(51) Int. Cl.
*F16M 11/00* (2006.01)
*B60N 3/02* (2006.01)
*F16B 17/00* (2006.01)

(52) U.S. Cl.
CPC ............ *B60N 3/026* (2013.01); *F16B 17/008* (2013.01)

(58) Field of Classification Search
CPC .............................. B60N 3/026; F16B 17/008
See application file for complete search history.

(56) References Cited

U.S. PATENT DOCUMENTS

| | | | |
|---|---|---|---|
| 7,896,417 B2 | 3/2011 | Gupta | |
| 8,439,392 B2* | 5/2013 | Westenberger | B60R 21/213 280/728.2 |
| 9,840,221 B2* | 12/2017 | England | B60R 21/232 |
| 10,071,665 B2* | 9/2018 | Ibrahim | B60N 3/02 |
| 2007/0267884 A1 | 11/2007 | Failla et al. | |
| 2020/0398723 A1* | 12/2020 | Steck | B60N 3/026 |

FOREIGN PATENT DOCUMENTS

JP        2009126297 A      6/2009

* cited by examiner

*Primary Examiner* — Amy J. Sterling
(74) *Attorney, Agent, or Firm* — Vichit Chea; Price Heneveld LLP

(57) ABSTRACT

A vehicle bracket assembly includes first and second platforms each including a body and connectors that extend from each of the bodies. A central base is disposed between the first and second platforms and are coupled to the first and second platforms via the connectors. First and second connecting legs are coupled to the body of each of the first and second platforms, respectively. A first attachment base is coupled to the first platform via the first connecting legs. A second attachment base includes a locating tab. The second attachment base is coupled to the second platform via the second connecting legs.

17 Claims, 8 Drawing Sheets

BRACKET ASSEMBLY FOR A VEHICLE

FIELD OF THE DISCLOSURE

The present invention generally relates to a bracket assembly for a vehicle. More specifically, the present disclosure relates to a handle bracket of the bracket assembly.

BACKGROUND OF THE DISCLOSURE

Vehicles often have brackets for coupling passenger assist handles to the frame of the vehicle to assist occupants, for example when an occupant enters or exits the vehicle. The bracket is typically two separate parts formed from a rigid material.

SUMMARY OF THE DISCLOSURE

According to one aspect of the present disclosure, a handle bracket for a vehicle includes first and second platforms. A first connector is coupled to the first platform. A second connector is coupled to the second platform. A central base is coupled to the first platform via the first connector and is coupled to the second platform via the second connector. A first pair of connecting legs is coupled to the first platform. A first side base is coupled to the first platform via the first pair of connecting legs. A second pair of connecting legs is coupled to the second platform. A second side base is coupled to the second platform via the second pair of connecting legs. The first side base, the second side base, and the central base each include an attachment surface.

According to another aspect of the present disclosure, a bracket assembly for a vehicle includes a first bracket that defines a locating aperture, and a second bracket that is coupled to the first bracket. The second bracket includes a central base that includes a first connector and a second connector. A first platform is coupled to the central base via the first connector. A second platform is coupled to the central base via the second connector. A first side base includes a first pair of connecting legs. The first pair of connecting legs are coupling the first side base to the first platform. A second side base includes a second pair of connecting legs. The second pair of connecting legs are coupling the second side base to the second platform.

According to another aspect of the present disclosure, a vehicle bracket assembly includes first and second platforms each including a body and connectors that extend from each of the bodies. A central base is disposed between the first and second platforms and are coupled to the first and second platforms via the connectors. First and second connecting legs are coupled to the body of each of the first and second platforms, respectively. A first attachment base is coupled to the first platform via the first connecting legs. A second attachment base includes a locating tab. The second attachment base is coupled to the second platform via the second connecting legs.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Additional features and advantages of the presently disclosed device will be set forth in the detailed description which follows and will be apparent to those skilled in the art from the description, or recognized by practicing the device as described in the following description, together with the claims and appended drawings.

Figure 1:
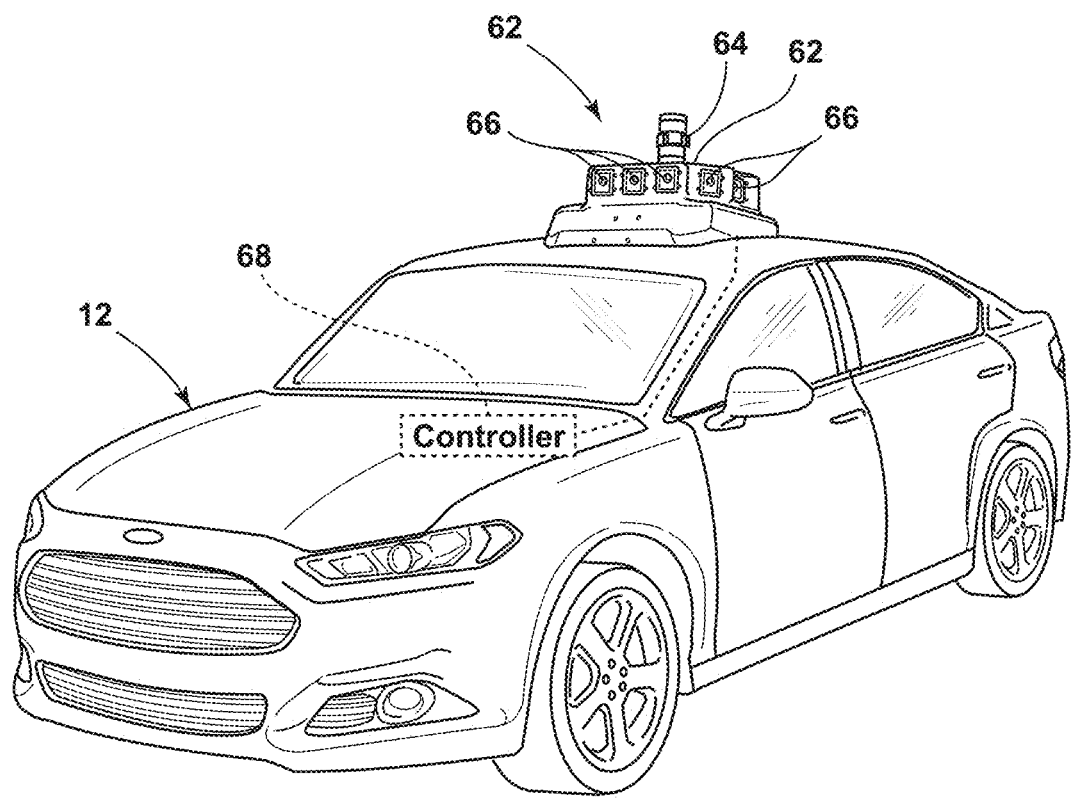
FIG. 1 is a front perspective view of a vehicle of the present disclosure.

For purposes of description herein, the terms "upper," "lower," "right," "left," "rear," "front," "vertical," "horizontal," and derivatives thereof shall relate to the disclosure as oriented in FIG. 1. However, it is to be understood that the disclosure may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

Referring to FIGS. 1-10, reference number 10 generally refers to a bracket assembly for a vehicle 12 that includes a handle bracket 14. The handle bracket 14 includes a first platform 16 and a second platform 18. A first connector 20 is coupled to the first platform 16, and a second connector 22 is coupled to the second platform 18. A central base 24 is coupled to the first platform 16 via the first connector 20 and is coupled to the second platform 18 via the second connector 22. A first pair of connecting legs 26 is coupled to the first platform 16, and a second pair of connecting legs 28 is coupled to the second platform 18. A first side base 30 is coupled to the first platform 16 via the first pair of connecting legs 26. A second side base 32 is coupled to the second platform 18 via the second pair of connecting legs 28. The first side base 30, the second side base 32, and the central base 24 each include an attachment surface 34. It is generally contemplated that the first and second side bases 30, 32 may also be referred to as the first and second attachment bases 30, 32, respectively.

Referring now to FIGS. 1-4, the vehicle 12 includes a vehicle body 40 and a roof 42 to define an interior 44 of the vehicle 12 having a passenger compartment 46 therein. The passenger compartment 46 may include a first seating row 48 and a second seating row 50. Fewer or more seating rows may be included in the vehicle 12, without departing from the teachings herein. The first seating row 48 may include a driver seat 52 and the passenger seat 54, and the second seating row 50 may include rear passenger seats 56. The rear passenger seats 56 of the second seating row 50 may include bucket seating or may be bench seating. As illustrated, the rear passenger seats 56 include a first rear passenger seat 58 and a second rear passenger seat 60.

A detection feature 62 may be disposed on the roof 42 of the vehicle 12, such that the vehicle 12 may be an autonomous vehicle (e.g., no human driver). It is generally contemplated that the detection feature 62 includes sensors 64 and cameras 66 configured to detect the surrounding environment. The detection feature 62 is generally disposed on the roof 42 of the vehicle 12 and is in communication with a controller 68, which generally controls the operation of the vehicle 12. The vehicle 12 may also be a partially autonomous vehicle (e.g., may be operated with or without a human driver). Additionally, the vehicle 12 may be utilized for personal and/or commercial purposes, such as ride-providing services (e.g., chauffeuring) and/or ride-sharing services.

Figure 2:
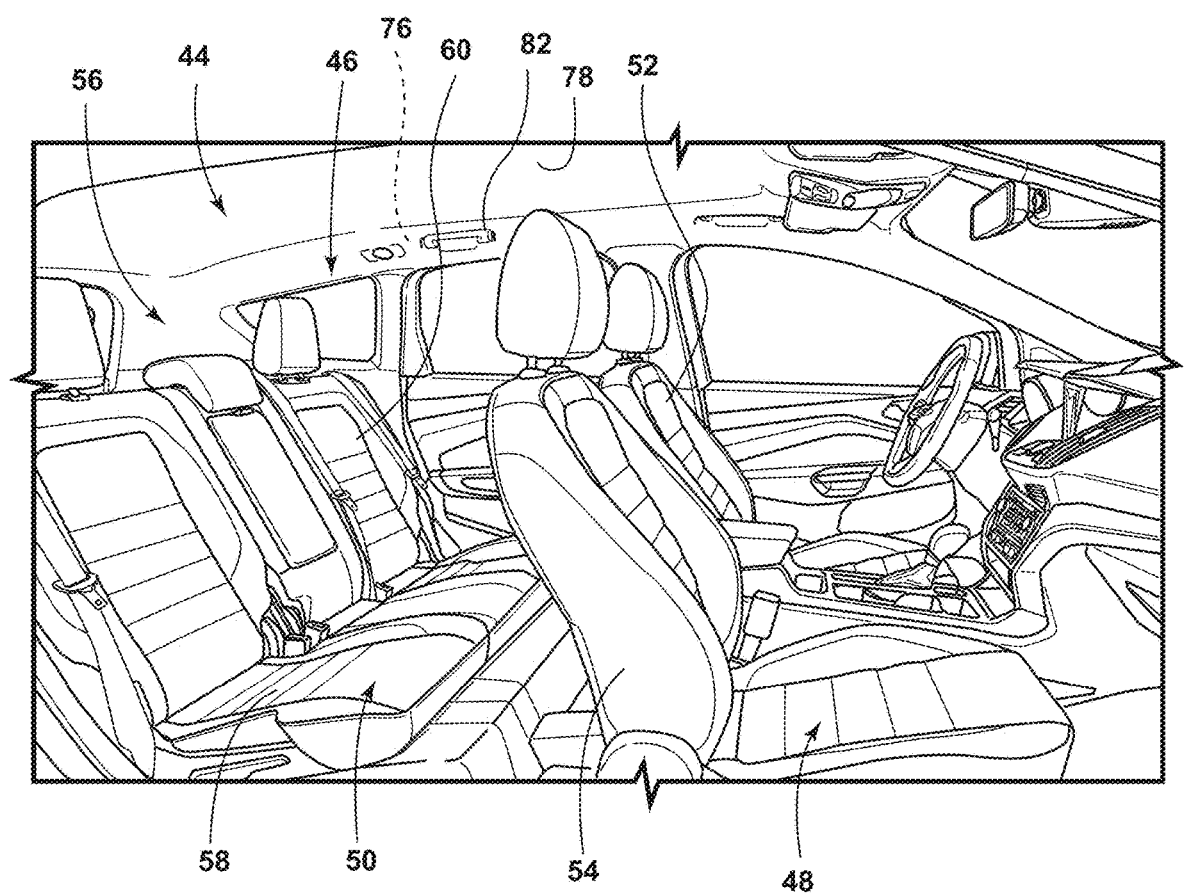
FIG. 2 is a partial side perspective view of a passenger compartment of the present disclosure.
Figure 3:
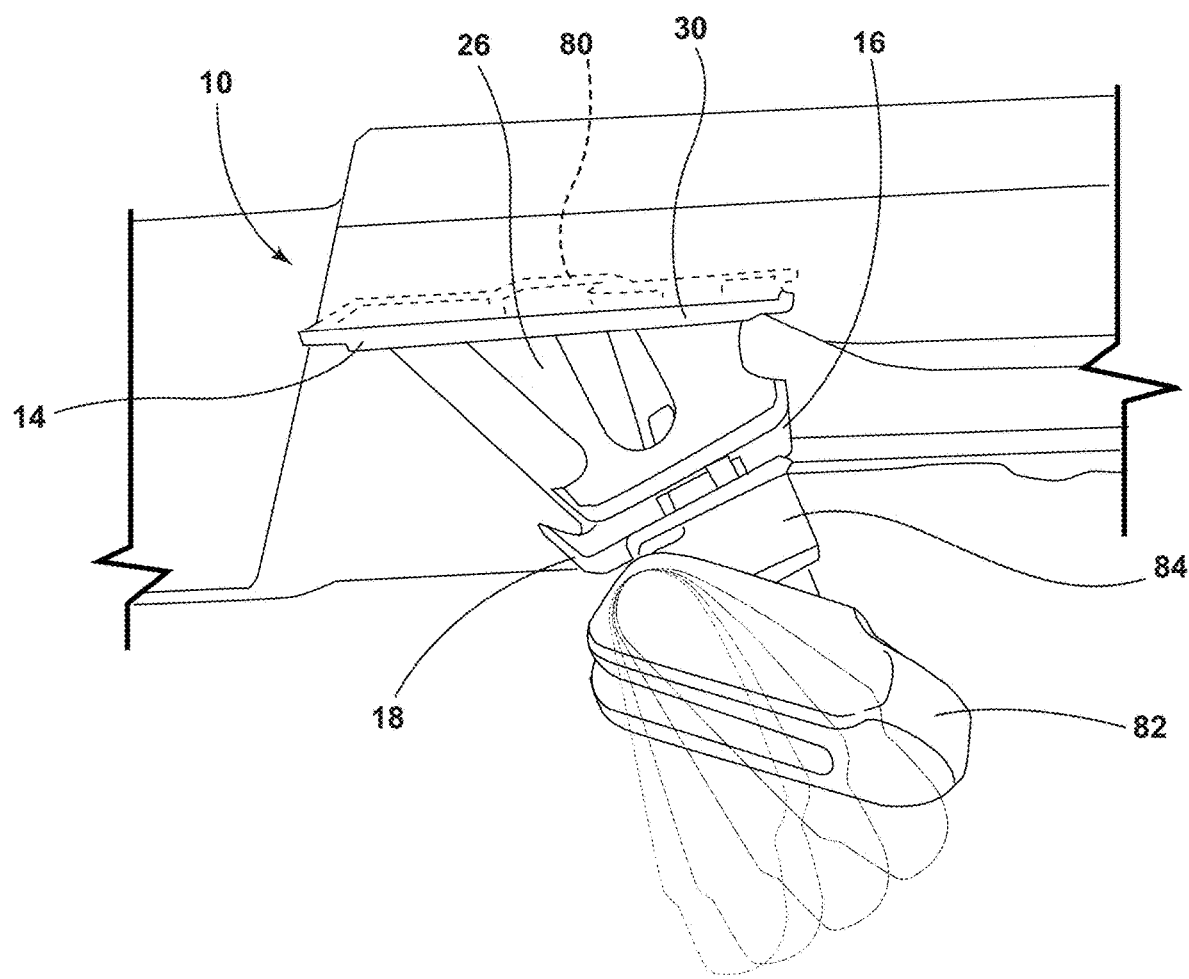
FIG. 3 is a partial side perspective view of a handle bracket of the present disclosure coupled to a handle and various positions of the handle in phantom.

The vehicle body 40 includes an A-pillar 76 to which a headliner 78 may be operably coupled. The bracket assembly 10 may be positioned between the headliner 78 and the roof 42. The bracket assembly 10 includes an attachment bracket 80 and the handle bracket 14. It is generally contemplated that the attachment bracket 80 may be referred to as a first bracket 80, and the handle bracket 14 may be referred to as a second bracket 14. As illustrated in FIGS. 2 and 3, the handle bracket 14 is coupled to the attachment bracket 80, described below, and a handle 82 is coupled to the handle bracket 14. The handle 82 may be coupled to the handle bracket 14 via retention features 84, which may include, but are not limited to, high retention clips. The retention features 84 couple to a body 86, 88 of the first and second platforms 16, 18, respectively, to retain the handle 82 to the handle bracket 14. The handle 82 is actionable between a variety of positions to assist a user while entering, exiting, and/or while sitting within the vehicle 12. By way of example, not limitation, the handle 82 may actuate at least at approximately 45-degrees, approximately 60-degrees, approximately 75-degrees, and approximately 90-degrees. It is also contemplated that the handle 82 may actuate at less than 45-degrees, 45-90 degrees, or greater than 90-degrees.

Figure 4:
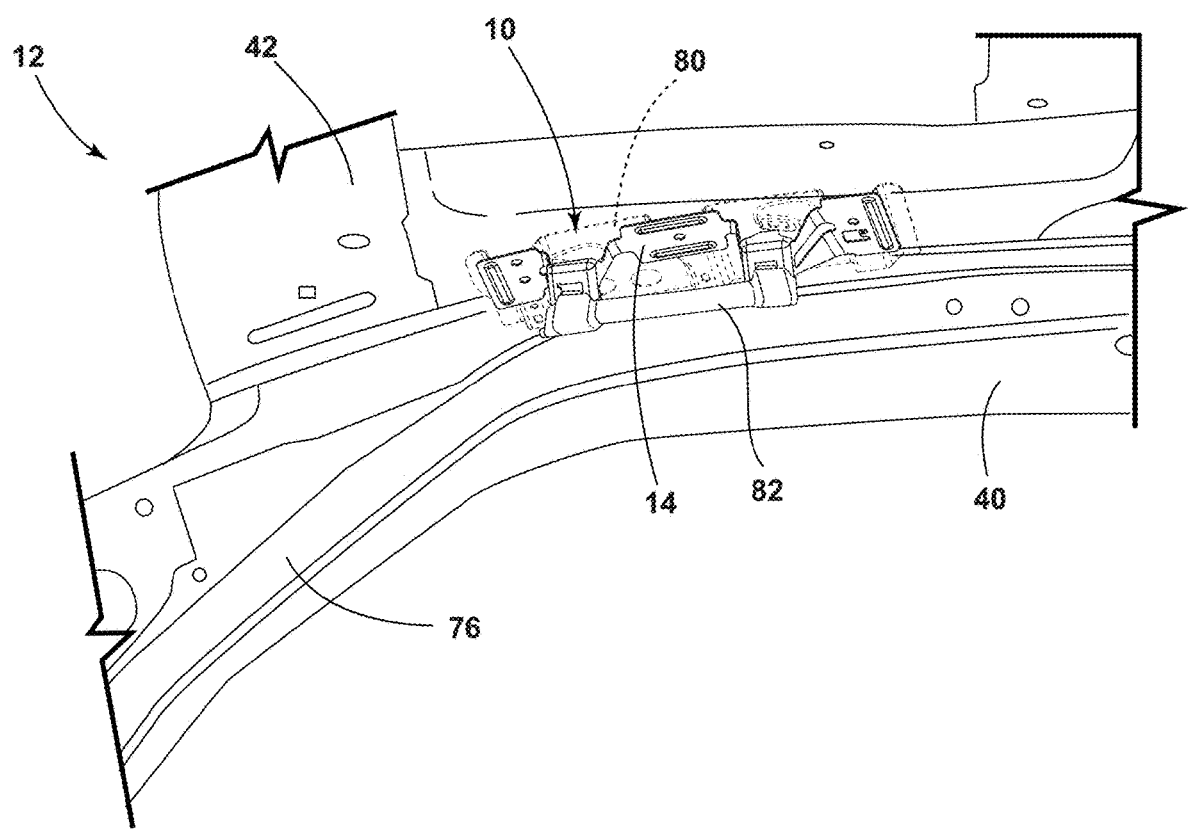
FIG. 4 is a partial side perspective view of a bracket assembly of the present disclosure coupled to an A-pillar of a vehicle.
Figure 5:
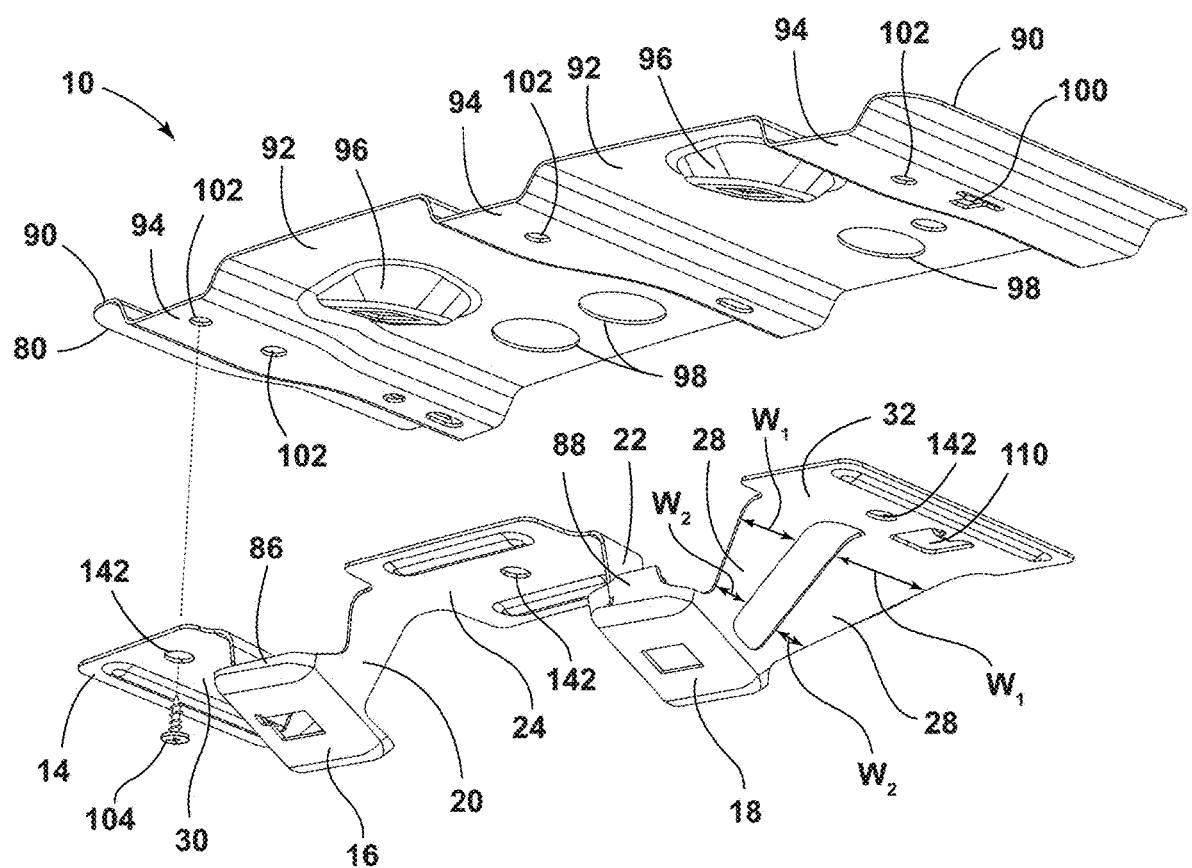
FIG. 5 is an exploded bottom perspective view of a bracket assembly of the present disclosure.
Figure 6:
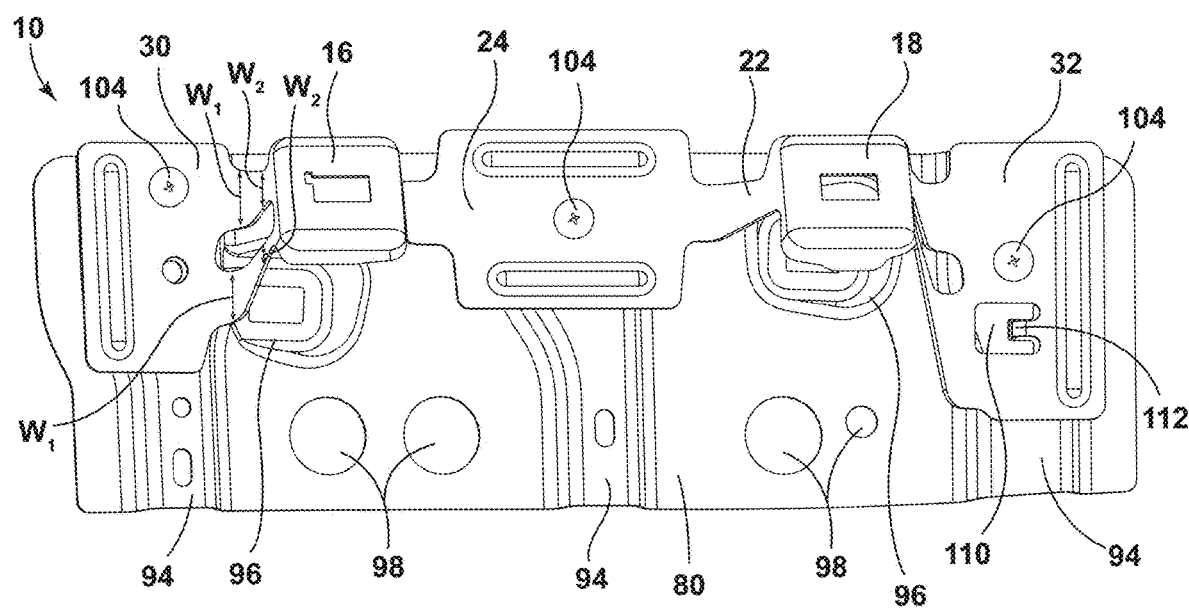
FIG. 6 is a bottom elevational view of the bracket assembly of FIG. 5.

Referring to FIGS. 4-6 and as mentioned above, the handle bracket 14 is coupled to the attachment bracket 80, which is coupled to the vehicle body 40. Typically, the attachment bracket 80 is coupled to the vehicle body 40 using spot welding or other attachment methods known in the art to securely couple the attachment bracket 80 with the vehicle body 40. The attachment bracket 80 includes flanges 90, which may be welded or otherwise fixedly coupled to the vehicle body 40 to secure the attachment bracket 80 with the vehicle body 40. The attachment bracket 80 defines recessed surfaces 92 and protruding surfaces 94. The recessed surfaces 92 include projections 96 and openings 98 through which electrical wiring or other mechanical elements may pass. At least one of the protruding surfaces 94 defines a locating aperture 100. It is generally contemplated that the locating aperture 100 may have a T-shape configuration. However, the locating aperture 100 may have another configuration or shape to retain the handle bracket 14 relative to the attachment bracket 80, described in further detail below. Coupling apertures 102 are also defined along the protruding surfaces 94, such that the locating aperture 100 may be defined proximate to at least one of the coupling apertures 102.

As will be described further below, the alignment of the locating aperture 100 relative to the handle bracket 14 corresponds with the alignment of the coupling apertures 102 with the handle bracket 14. This alignment promotes ease of coupling the handle bracket 14 to the attachment bracket 80. The handle bracket 14 is coupled to the attachment bracket 80 via fasteners 104, which extend through the coupling apertures 102 defined by the attachment bracket 80. As illustrated in FIG. 6, the projections 96 may be proximally aligned with the first and second platforms 16, 18, such that the retention features 84 of the handle 82 may extend through the first and second platforms 16, 18 and may further couple the handle 82 to the attachment platform 80.

Figure 7:
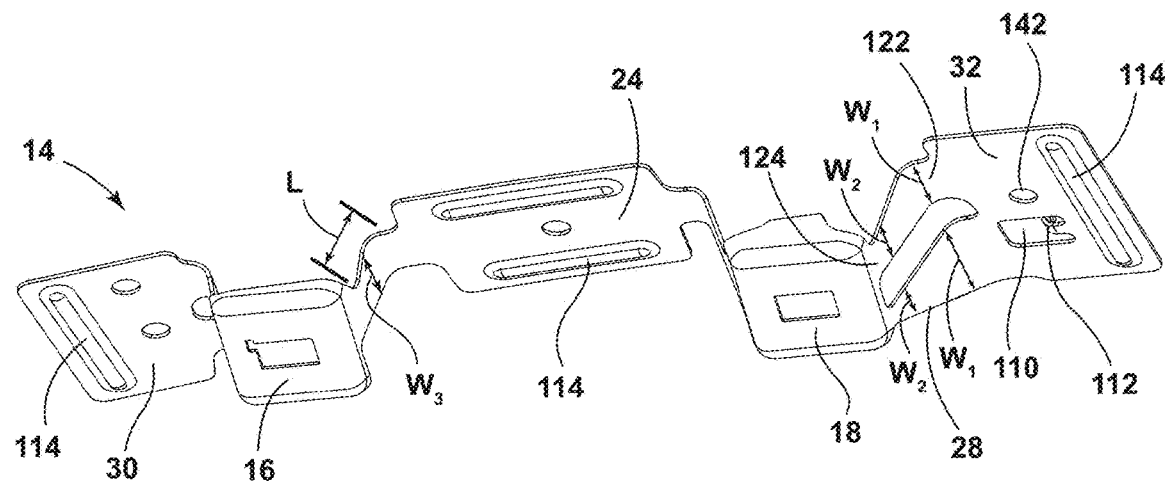
FIG. 7 is a bottom perspective view of a handle bracket of the present disclosure.
Figure 8:
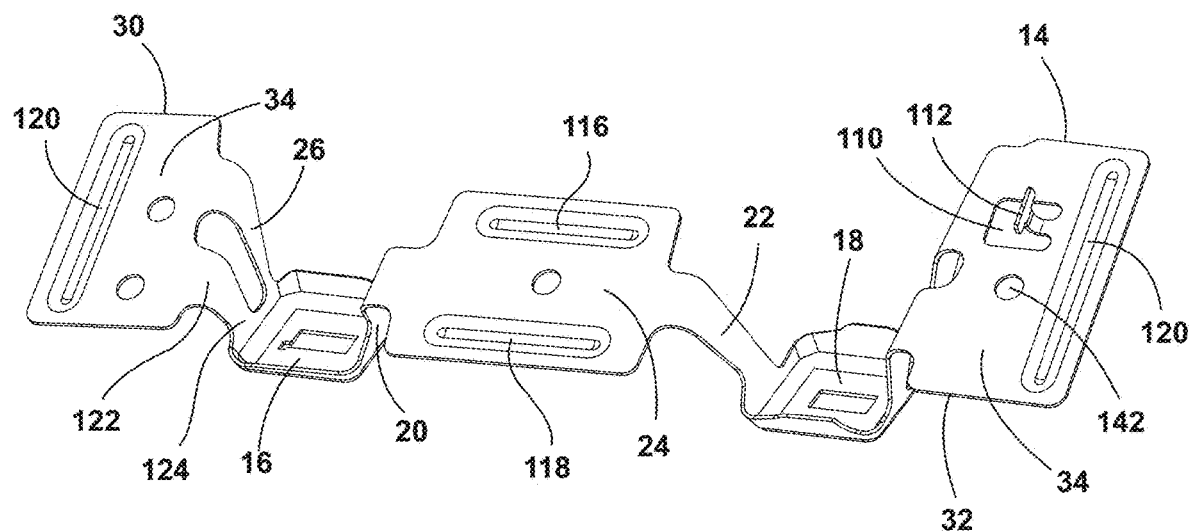
FIG. 8 is a top perspective view of the handle bracket of FIG. 7.

With further reference to FIGS. 6-8, the handle bracket 14 includes the first and second side bases 30, 32 disposed proximate to the first and second platforms 16, 18, respectively. It is also contemplated that the first and second side bases 30, 32 may be referred to as first and second attachment bases 30, 32, respectively. The first pair of connecting legs 26, mentioned above, outwardly extend from the first attachment base 30 and couple the first attachment base 30 to the first platform 16. Similarly, the second pair of connecting legs 28 outwardly extend from the second attachment base 32 and couple the second attachment base 32 to the second platform 18. As mentioned above, the central base 24 is positioned between the first and second platforms 16, 18 and is coupled to each via the first and second connectors 20, 22.

Each of the first and second attachment bases 30, 32 and the central base 24 have the attachment surface 34, such that the attachment surface 34 abuts the attachment bracket 80 when the handle bracket 14 is coupled to the attachment bracket 80. As illustrated in FIG. 8, the second attachment base 32 defines an aperture 110 from which a locating feature 112 extends. The locating feature 112 extends away from the attachment surface 34 toward the attachment bracket 80. It is generally contemplated that the locating feature 112 is configured to fit within the locating aperture 100 defined by one of the protruding surfaces 94 of the attachment bracket 80. The locating feature 112 has a similar shape and/or configuration as the locating aperture 100, such that the locating feature 112 and the locating aperture 100 define a complimentary interlocking or mating arrangement, defined further below.

Referring still to FIGS. 6-8, elongated members 114 may be defined along each of the first and second attachment bases 30, 32 and the central base 24. Stated differently, the central base 24 may define first and second elongated members 116, 118 and each of the first and second attachment bases 30, 32 may define a single elongated member 120. The elongated members 114 are configured to disperse tension that may be defined by the engagement between the handle bracket 14 and the attachment bracket 80. By way of example, not limitation, the elongated members 114 minimize overall displacement of the handle bracket 14 to balance the overall tension load that may be defined by the user manipulating the handle 82 (FIG. 3).

The central base 24 is coupled to each of the first and second platforms 16, 18 via the connectors 20, 22. The connectors 20, 22 are generally rectangular, such that the connectors 20, 22 each have a generally consistent width W3 along a length L of each of the connectors 20, 22. The connectors 20, 22 may provide overall central stability for the first and second platforms 16, 18, as compared to the connecting legs 26, 28. For example, the connecting legs 26, 28 may provide lateral displacement of the first and/or second platforms 16, 18 upon impact, while the connectors 20, 22 may generally maintain the formation of the first and second platforms 16, 18 relative to the central base 24.

The general manipulation of the handle 82 (FIG. 3) is further balanced and stabilized by the first and second pairs of connecting legs 26, 28. As illustrated in FIGS. 7 and 8, the connecting legs 26, 28 generally define a triangular shape. The connecting legs 26, 28 each have a base attachment end 122 and a platform attachment end 124, such that the base attachment end 122 is coupled to the respective first and second side bases 30, 32 and the platform attachment end 124 is coupled to the respective first and second platforms 16, 18. The base attachment end 122 may also be referred to as the stability end 122, and the platform attachment end 124 may also be referred to as the pliable end 124.

It is generally contemplated that the stability end 122 has a width $W_1$ that is greater than a width $W_2$ of the pliable end 124. For example, the width $W_2$ of the pliable end 124 may be approximately 7 millimeters, and the width $W_1$ of the stability end 122 may be approximately 40 millimeters. It is also contemplated that the width $W_2$ of the pliable end 124 may be less than 7 millimeters or greater than 7 millimeters and that the width $W_1$ of the stability end 122 may be less than 40 millimeters or greater than 40 millimeters. The varying widths $W_1$, $W_2$ of the stability end 122 and the pliable end 124 generally define the triangular shape of the connecting legs 26, 28.

Figure 9:
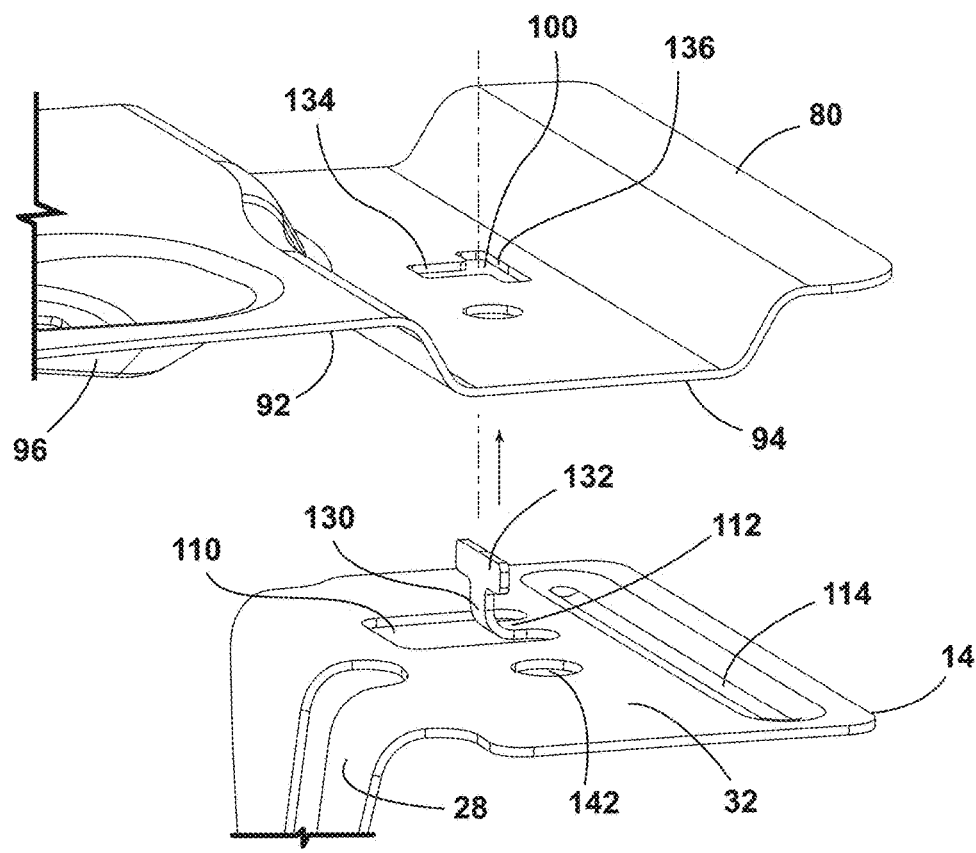
FIG. 9 is a partial exploded side perspective view of an attachment bracket and a handle bracket of the present disclosure.

With further reference to FIGS. 7 and 9, the width $W_1$ of the stability end 122 provides structural stability for each of the first and second platforms 16, 18. As mentioned above, the user utilizes the handle 82 (FIG. 3) to assist entry and exiting of the vehicle 12 (FIG. 1), such that the user may pull, push, twist, or otherwise indirectly and/or directly apply tensile forces to the handle bracket 14. The stability end 122 of each of the connecting legs 26, 28 may absorb and distribute the tensile forces to the first and second attachment bases 30, 32. The tensile force may then be further dissipated by each of the elongated members 114. Comparatively, the pliable end 124 is configured to compress and bend upon impact. The smaller width $W_2$ of the pliable ends 124 of each connecting leg 26, 28 generally provides less resistance to movement of each of the first and second platforms 16, 18 upon forceful impact.

Figure 10:
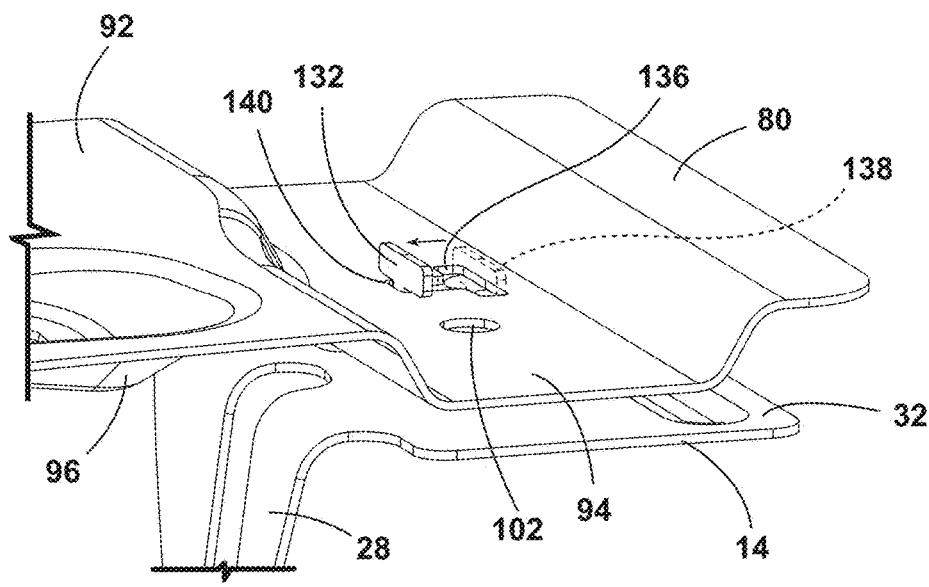
FIG. 10 is a partial side perspective vie$_w$ of the attachment bracket and the handle bracket of FIG. 9 in a locked position.

Referring now to FIGS. 8-10, the locating feature 112 is selectively disposed within the locating aperture 100 defined by the attachment bracket 80. The locating feature 112 includes a stem 130 and a tab 132 to generally define the T-shape of the locating feature 112. The locating aperture 100 similarly defines a stem aperture 134 and a tab aperture 136, which generally defines the T-shape of the locating aperture 100 mentioned above. The tab 132 of the locating feature 112 may extend through the tab aperture 136 in a first position 138 when positioning the handle bracket 14 relative to the attachment bracket 80. The handle bracket 14 may be adjusted, such that the locating feature 112 translates within the locating aperture 100 so the stem 130 is disposed within the stem aperture 134 in a second position 140. It is generally contemplated that the second position 140 of the locating feature 112 may also be referred to as a locked position 140. The locked position 140 of the locating feature 112 generally stabilizes the handle bracket 14 relative to the attachment bracket 80.

Specifically, the locating feature 112 may selectively couple the handle bracket 14 to the attachment bracket 80 in the locked position 140. The configuration of the locating feature 112 of the handle bracket 14 and the locating aperture 100 of the attachment bracket 80 generally minimizes potential error in assembling the bracket assembly 10. The locating feature 112 and the locating aperture 100 inform the placement of the handle bracket 14 relative to the attachment bracket 80, and the translation of the locating feature 112 from the first position 138 to the second position 140 provides proper alignment of the handle bracket 14 with the attachment bracket 80. By way of example, not limitation, the coupling apertures 102 of the attachment bracket 80 are generally aligned with fastening apertures 142 of the handle bracket 14 in the second position 140.

Referring again to FIGS. 1-10, the engagement of the locating feature 112 with the attachment bracket 80 minimizes the bracing of the handle bracket 14 during assembly of the bracket assembly 10. Specifically, the locating feature 112 both retains and aligns the handle bracket 14 relative to the attachment bracket 80 providing a hands-free assembly of the bracket assembly 10. Moreover, the handle bracket 14 includes the first and second platforms 16, 18 that are integrally formed with each of the first and second side bases 30, 32 and the central base 24 via the connecting legs 26, 28 and the connectors 20, 22. The triangular shape of the connecting legs 26, 28 provide both the structural integrity and stability due to the width $W_1$ of the stability end 122 and provide pliability and compressibility due to the narrower width $W_2$ of the pliable end 124. Thus, the handle bracket 14 improves the overall assembly process of the bracket assembly 10 while improving the overall performance of the handle bracket 14.

According to one example, a handle bracket for a vehicle includes first and second platforms. A first connector is coupled to the first platform. A second connector is coupled to the second platform. A central base is coupled to the first platform via the first connector and is coupled to the second platform via the second connector. A first pair of connecting legs is coupled to the first platform. A first side base is coupled to the first platform via the first pair of connecting legs. A second pair of connecting legs is coupled to the second platform. A second side base is coupled to the second platform via the second pair of connecting legs. The first side base, the second side base, and the central base each include an attachment surface. Embodiments of the present disclosure may include one or a combination of the following features.

A first side base defines an aperture and includes a locating feature that extends through the aperture and away from an attachment surface of the first side base.

A locating feature defines a T-shape.

Each of first and second platforms, a central base, first and second pairs of connecting legs, first and second side bases, and first and second connectors are integrally formed.

A base attachment end of a first pair of connecting legs is configured to stabilize a first attachment platform and the base attachment end of a second pair of connecting legs is configured to stabilize a second attachment platform.

First and second pairs of connecting legs define a triangular shape having a stability end and a pliable end.

A stability end has a width greater than a width of a pliable end.

According to another example, a bracket assembly for a vehicle includes a first bracket that defines a locating aperture, and a second bracket that is coupled to the first bracket. The second bracket includes a central base that includes a first connector and a second connector. A first platform is coupled to the central base via the first connector. A second platform is coupled to the central base via the second connector. A first side base includes a first pair of connecting legs. The first pair of connecting legs are coupling the first side base to the first platform. A second side base includes a second pair of connecting legs. The second pair of connecting legs are coupling the second side base to the second platform. Embodiments of the present disclosure may include one or a combination of the following features.

First and second side bases each define an elongated member that are configured to balance tension loads of a second bracket.

A second bracket includes a locating feature that has a stem and a flange that outwardly extends from the stem.

A locating feature is disposed within a locating aperture of a second bracket and is operable between a first position and a second position.

A second bracket is coupled to a first bracket in a second position of a locating feature.

Each first and second pair of connecting legs include a base attachment portion and a platform attachment portion. Each of the base attachment portions have a width greater than a width of the platform attachment portion.

Each first and second pair of connecting legs define a triangular shape.

According to yet another example, a vehicle bracket assembly includes first and second platforms each including a body and connectors that extend from each of the bodies. A central base is disposed between the first and second platforms and are coupled to the first and second platforms via the connectors. First and second connecting legs are coupled to the body of each of the first and second platforms, respectively. A first attachment base is coupled to the first platform via the first connecting legs. A second attachment base includes a locating tab. The second attachment base is coupled to the second platform via the second connecting legs. Embodiments of the present disclosure may include one or a combination of the following features.

An attachment bracket defines a locating aperture proximate to a locating tab of a second attachment base.

A locating tab is disposed within a locating aperture and selectively couples a second attachment base to an attachment bracket in a locked position of the locating tab.

First and second connecting legs each define a triangular shape.

A central base includes first and second elongated members that are configured to disperse tension along the central base.

First and second connecting legs each have a stability end and a pliable end. The stability end of the first connecting legs is coupled to a first attachment base and the stability end of the second connecting legs is coupled to a second attachment base.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

Furthermore, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected" or "operably coupled" to each other to achieve the desired functionality, and any two components capable of being so associated can also be viewed as being "operably couplable" to each other to achieve the desired functionality. Some examples of operably couplable include, but are not limited to, physically mateable and/or physically interacting components and/or wirelessly interactable and/or wirelessly interacting components and/or logically interacting and/or logically interactable components. Furthermore, it will be understood that a component preceding the term "of the" may be disposed at any practicable location (e.g., on, within, and/or externally disposed from the vehicle) such that the component may function in any manner described herein.

Modifications of the disclosure will occur to those skilled in the art and to those who make or use the disclosure. Therefore, it is understood that the embodiments shown in the drawings and described above are merely for illustrative purposes and not intended to limit the scope of the disclosure, which is defined by the following claims, as interpreted according to the principles of patent law, including the doctrine of equivalents.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A handle bracket for a vehicle, comprising:
   first and second platforms;
   a first connector coupled to the first platform;
   a second connector coupled to the second platform;
   a central base coupled to the first platform via the first connector and coupled to the second platform via the second connector;
   a first pair of connecting legs coupled to the first platform;
   a first side base coupled to the first platform via the first pair of connecting legs;
   a second pair of connecting legs coupled to the second platform, wherein the first and second pairs of connecting legs define a triangular shape having a stability end and a pliable end; and
   a second side base coupled to the second platform via the second pair of connecting legs, wherein the first side base, the second side base, and the central base each include an attachment surface.

2. The handle bracket of claim 1, wherein the second side base defines an aperture and includes a locating feature extending through the aperture and away from the attachment surface of the first side base.

3. The handle bracket of claim 2, wherein the locating feature defines a T-shape.

4. The handle bracket of claim 1, wherein each of the first and second platforms, the central base, the first and second pairs of connecting legs, the first and second side bases, and the first and second connectors are integrally formed.

5. The handle bracket of claim 1, wherein a base attachment end of the first pair of connecting legs is configured to stabilize the first platform and a base attachment end of the second pair of connecting legs is configured to stabilize the second platform.

6. The handle bracket of claim 1, wherein the stability end has a width greater than a width of the pliable end.

7. A bracket assembly for a vehicle, comprising:
   a first bracket defining a locating aperture; and
   a second bracket coupled to the first bracket, the second bracket comprising:
   a central base including a first connector and a second connector;
   a first platform coupled to the central base via the first connector;
   a second platform coupled to the central base via the second connector;
   a first side base including a first pair of connecting legs, the first pair of connecting legs coupling the first side base to the first platform; and
   a second side base including a second pair of connecting legs, the second pair of connecting legs coupling the second side base to the second platform, and wherein each of the first and second pairs of connecting legs include a base attachment portion and a platform attachment portion, and wherein each of the base attachment portions have a width greater than a width of the platform attachment portion.

8. The bracket assembly of claim 7, wherein the first and second side bases each define an elongated member configured to balance tension loads of the second bracket.

9. The bracket assembly of claim 7, wherein the second bracket includes a locating feature that has a stem and a flange outwardly extending from the stem.

10. The bracket assembly of claim 9, wherein the locating feature is disposed within the locating aperture of the second bracket and is operable between a first position and a second position.

11. The bracket assembly of claim 10, wherein the second bracket is coupled to the first bracket in the second position of the locating feature.

12. The bracket assembly of claim 7, wherein each of the first and second pairs of connecting legs define a triangular shape.

13. A vehicle bracket assembly, comprising:
   first and second platforms each including a body and connectors extending from each of the bodies;
   a central base disposed between the first and second platforms and coupled to the first and second platforms via the connectors;
   first and second connecting legs coupled to the body of each of the first and second platforms, respectively, wherein the first and second connecting legs each have a stability end and a pliable end, and wherein the stability end of the first connecting legs is coupled to the first attachment base and the stability end of the second connecting legs is coupled to the second attachment base;
   a first attachment base coupled to the first platform via the first connecting legs; and
   a second attachment base including a locating tab, the second attachment base coupled to the second platform via the second connecting legs.

14. The vehicle bracket assembly of claim 13, further comprising:
   an attachment bracket defining a locating aperture proximate to the locating tab of the second attachment base.

15. The vehicle bracket assembly of claim 14, wherein the locating tab is disposed within the locating aperture and selectively couples the second attachment base to the attachment bracket in a locked position of the locating tab.

16. The vehicle bracket assembly of claim 13, wherein the first and second connecting legs each define a triangular shape.

17. The vehicle bracket assembly of claim 13, wherein the central base includes first and second elongated members configured to disperse tension along the central base.

* * * * *